United States Patent [19]
Haskett

[11] Patent Number: 5,792,242
[45] Date of Patent: Aug. 11, 1998

[54] ELECTROSTATIC FIBROUS FILTER WEB

[75] Inventor: Thomas E. Haskett, Oakdale, Minn.

[73] Assignee: Minnesota Mining and Manufacturing Co., St. Paul, Minn.

[21] Appl. No.: 606,810

[22] Filed: Feb. 26, 1996

[51] Int. Cl.$^6$ ................................................. B03C 3/155
[52] U.S. Cl. .......................... 96/68; 55/486; 55/528; 55/DIG. 39; 96/69; 442/36
[58] Field of Search .................... 96/17, 15, 65–69; 55/486, 527, 528, DIG. 5, DIG. 39, DIG. 35; 264/484, DIG. 8, DIG. 48; 442/36, 59

[56] References Cited

U.S. PATENT DOCUMENTS

| | | | |
|---|---|---|---|
| Re. 30,782 | 10/1981 | van Turnhout | 264/DIG. 48 |
| Re. 31,285 | 6/1983 | van Turnhout | 264/DIG. 48 |
| 3,675,403 | 7/1972 | Ruffo | 55/524 |
| 4,215,682 | 8/1980 | Kubik et al. | 128/205.29 |
| 4,363,682 | 12/1982 | Thiebault | 428/218 X |
| 4,456,648 | 6/1984 | Adamse et al. | 428/921 X |
| 4,478,620 | 10/1984 | Tamura | 55/486 |
| 4,588,537 | 5/1986 | Klaase et al. | 264/DIG. 48 |
| 4,592,815 | 6/1986 | Nakao | 522/161 X |
| 4,789,504 | 12/1988 | Ohmori et al. | 55/DIG. 39 |
| 4,798,850 | 1/1989 | Brown | 521/134 |
| 4,874,399 | 10/1989 | Reed et al. | 55/DIG. 39 |
| 4,904,174 | 2/1990 | Moosmayer et al. | 425/174.8 E |
| 5,037,455 | 8/1991 | Scheineson et al. | 96/17 |
| 5,038,775 | 8/1991 | Maruscak et al. | 55/DIG. 39 |
| 5,122,048 | 6/1992 | Deeds | 425/174.8 E |
| 5,230,800 | 7/1993 | Nelson | 210/496 |
| 5,401,446 | 3/1995 | Tsai et al. | 361/225 X |
| 5,419,953 | 5/1995 | Chapman | 428/284 |
| 5,436,054 | 7/1995 | Tani et al. | 428/131 |
| 5,620,785 | 4/1997 | Watt et al. | 55/DIG. 39 |

FOREIGN PATENT DOCUMENTS

| | | |
|---|---|---|
| 0 383 236 B1 | 12/1992 | European Pat. Off. . |
| WO 93/16783 | 9/1993 | WIPO . |
| WO 97/40913 | 11/1997 | WIPO . |

Primary Examiner—Richard L. Chiesa
Attorney, Agent, or Firm—Gary Griswold; Robert Sprague; William J. Bond

[57] ABSTRACT

There is provided a nonwoven electret fiber filter formed with a nonwoven web of electret fibers needle-punched to an open scrim support. The scrim support material has individual discrete open areas with an average cross-sectional area as viewed from the plane of the filter media of at least 0.25 mm$^2$, preferably 1.0 mm$^2$, and a pressure drop across the scrim support, without the filter web, of less than 1.5 mm H$_2$O measured at 98.4 meters/min gaseous face velocity. The resulting filter has enhanced lifetimes, a low pressure drop and high filtration efficiencies.

20 Claims, 1 Drawing Sheet

ELECTROSTATIC FIBROUS FILTER WEB

BACKGROUND AND FIELD OF THE INVENTION

The present invention relates to a process for forming an electret nonwoven filter and products of such a process.

Nonwoven webs of electret fibers are typically formed of loosely associated electret-charged fibers. The filters can be electrostatically charged prior to, during, or after being formed into a nonwoven web. For example, post-formation charging is described in U.S. Pat. No. 4,588,537 which charges a lofty nonwoven web which can be formed by a variety of methods including carding and melt blowing. The webs are charged while under compression and then permitted to return to their original loft.

Fibers can also be charged while they are being formed as disclosed in U.S. Pat. No. 4,215,682 (Kubik et al.), where melt-blown fibers are bombarded by ions or electrons immediately after being extruded from melt-blowing orifices. The fibers solidify extremely rapidly in the atmosphere and are collected as a semi-coherent mass of entangled microfibers as the fiber web. The fiber webs are described as preferably open to provide a low pressure drop for liquid passing through a filter formed of the fibrous web.

Fibers can also be charged as described in U.S. Pat. No. 4,798,850. This patent describes blending different fibers together, which when properly selected will induce an electrostatic charge in the fibers as the fibrous web is formed. Other patents relating to charging fibers or fibrous webs include U.S. Pat. Nos. 4,904,174; 5,122,048; 5,401,446; and 4,592,815.

A particularly effective method of forming a nonwoven electret fiber filter web is described in U.S. Reissue Pat. No. 30,782 (Van Turnout et al.). The electret fibers in this patent are formed from a corona charged film that is fibrillated to form the charged fibers. The charged fibers can then be formed into a nonwoven filter web by common methods such as carding or air laying. This charging method provides a particularly high density of injected charges in the finished fibers. However, problems are often encountered with forming webs from these precharged fibers. The fibers are generally quite large and uncrimped. They also have a resistance to bending. Due in part to these properties, the fibers resist formation into a uniform coherent web, particularly at low basis weights. This problem is partially addressed in U.S. Pat. No. 4,363,682, which proposes the use of such fibrillated fiber webs in face mask applications. In order to provide a more coherent web, as well as one that resists shedding fibers, this patent proposes a post-embossing treatment. This post-embossing welds the outer surface fibers together allegedly providing a more coherent and comfortable web for use as a face mask. However, this treatment will also tend to result in a more condensed web, which would increase pressure-loss across the filter web and decreases filter life.

An improvement over the embossing treatment is disclosed in U.S. Pat. No. 5,230,800. This patent proposes needle-punching the fibrillated electret fiber filter webs (e.g., prepared via the Van Turnout et al. method) onto a scrim support. The result is a consolidated coherent fibrous filter composite material with improved uniformity and filtration performance.

The present investigator was concerned with providing a nonwoven electret fiber filter with long filter lifetimes and low pressure drops without loss of filter performance, which filter material can be economically and simply manufactured and easily converted into the final filter form.

BRIEF DESCRIPTION OF THE INVENTION

A nonwoven electret fiber filter media and filter is obtained by forming the filter media using a nonwoven web of electret fibers on an open scrim support. An unsupported nonwoven fibrous filter web is placed onto the open, substantially non-extensible, scrim support material. The scrim support material has individual discrete open areas with an average cross-sectional area as viewed from the plane of the filter media of at least 0.25 mm$^2$, preferably 1.0 mm$^2$, and a pressure drop across the scrim support, without the filter web, of less than 1.5 mm $H_2O$ measured at 98.4 meters/min face velocity. The unsupported fibrous filter web and the scrim support are joined to form the filter media by needle-punching the filter web and scrim support material to provide a highly uniform nonwoven fibrous filter media with enhanced lifetime and filtration performance. At least certain of the fibers forming the nonwoven fibrous filter web are provided with an electret charge.

BRIEF DESCRIPTION OF THE PREFERRED EMBODIMENTS

Figure 1:
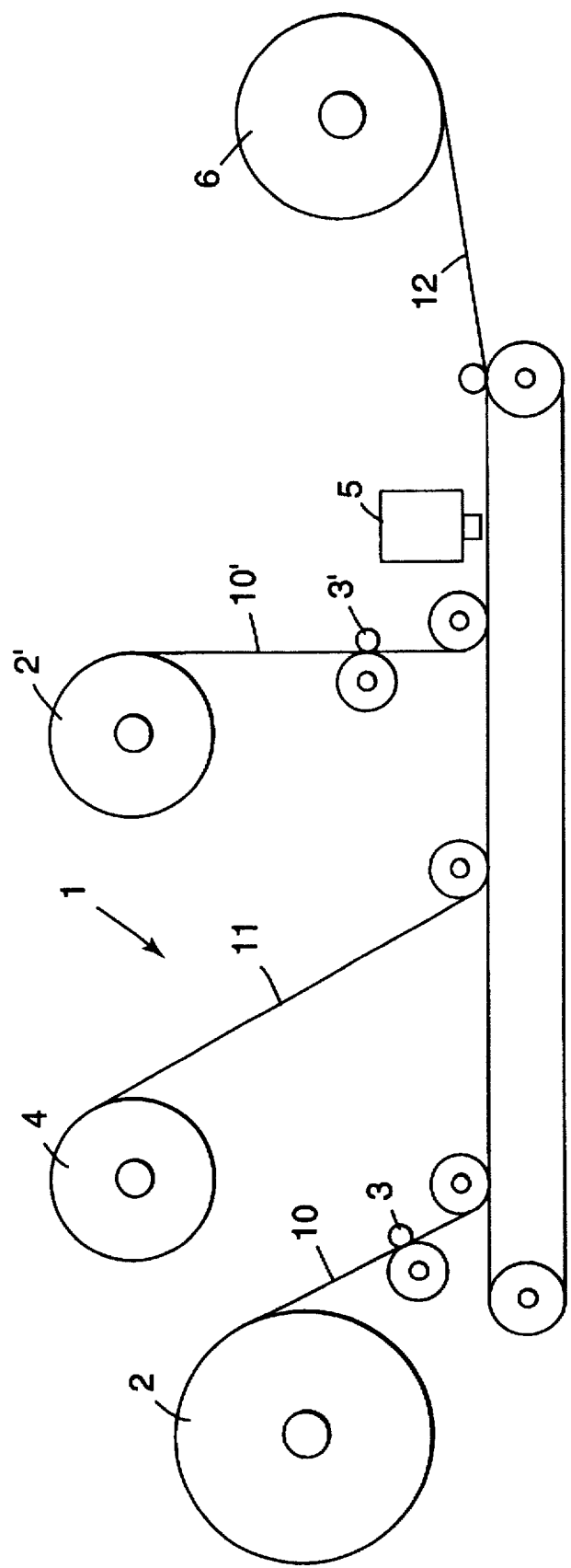
FIG. 1 is a schematic representation of a preferred process arrangement according to the invention method.

The present invention relates to an improvement over the invention disclosed in U.S. Pat. No. 5,230,800, which describes a method of combining a fibrous web of fibrillated electret fibers and a support scrim by a needle-punching operation in a manner in which produces a filter media which is extremely uniform in its physical and performance characteristics. However, the present inventor was concerned not only in providing a filter media which had uniformity of properties as discussed in the above U.S. Pat. No. 5,230,800 but also one which would provide a high level of filtration efficiency at a relatively high gaseous face velocity over an extended lifetime. Particularly, of concern was providing a superior filter media for use in forming a high performance furnace filter, or a like general purpose air-cleaning filter which must efficiently filter large volumes of air for as long a lifetime as practically possible. Preferably, the filter media should also perform well at high gaseous face velocities (e.g., greater than 250 m/min) such that it can be used either as a flat filter, or a pleated filter for enhanced performance. Unexpectedly it was found that by proper selection of the scrim support to which a fibrous filter web layer is joined by needle-punching a nonwoven fibrous filter media with electret fibers could be formed which had both high filtration performance at high gaseous face velocities and an extended lifetime.

Specifically, the invention filter web scrim support should be an extremely open material having a large number of discrete open areas, which open areas pass through the scrim from one face to the opposite face. These discrete open areas should have an average cross-sectional area of at least 0.25 mm$^2$, most preferably at least 1.0 mm$^2$, however, the individual open areas can range in size from 0.1 mm$^2$ up to 10 mm$^2$ or larger. Preferably, the open areas have a non-tortuous path through the scrim, most preferably the open areas extend directly from one face to the opposite face(e.g., as a column). Generally, the ratio of open area average pathlength through the scrim to the average scrim thickness is from 3 to 1, preferably from 2 to 1 and less. The scrim open area can also be described in terms of an Effective Circular Diameter (ECD) which is the diameter of the largest circle that can fit into an individual discrete open area. The average ECD is generally at least 300 μm, preferably at least 500 μm. Despite the extremely open nature of the scrim support material, it should be reasonably strong, generally having a tensile strength of at least 50 kg/m, preferably at least 100 kg/m. The overall pressure drop of the scrim material should be relatively small in comparison to the pressure drop across the electret-charged filter web material (e.g., less than 50 percent preferably less than 30 percent of the filter web pressure drop) and generally will have a pressure-drop of less than 1.5 mm $H_2O$, preferably less than 1.0 mm $H_2O$, and most preferably less than 0.5 mm $H_2O$ at a gaseous face velocity of 98.4 meters/min at ambient conditions.

The scrim material can be formed of any suitable material such as a thermoplastic polymer, ductile metal or the like. Preferably, the scrim is formed of thermoplastic fibers such as a scrim or netting material such as the cross-laminated polyethylene fibers sold under the trade name CLAF by Amoco. Other cross laminated fiberous webs could also be used, with the lamination done by conventional techniques such as heat, sonics or adhesive lamination. If the final filter is to be pleated, the scrim is also preferably pleatable so that additional pleating layers need not be used, however, conventional pleatable layers can be used if desired.

The fibrous filter web layer is a nonwoven fibrous web where at least a portion of the fibers forming the web are individually provided with an electrostatic charge, generally referred to as electret fibers. These electret fibers can be charged by known methods, e.g., by use of corona discharge electrodes or high-intensity electric fields or by tribocharging (as described in U.S. Pat. No. 4,798,850). The fibers can be charged during fiber formation, prior to or while forming the fibers into the filter web or subsequent to forming the filter web. The fibers forming the filter web can even be charged subsequent to being joined to the scrim support layer. The nonwoven fibrous filter web can be formed by conventional nonwoven techniques including melt blowing, carding, Rando, spin bonding or the like, preferably the web is not consolidated (e.g., by hydroentanglement, heat or sonic bonding or the like) but can be if desired.

The fibrous filter web layer or layers can have a total basis weight ranging from 10 to 400 grams/$M^2$, preferably from 20 to 150 grams/$M^2$ for furnace filter applications. Generally, the filter layer or layers have a combined total pressure-drop of less than about 10 mm $H_2O$, preferably less than 6 mm $H_2O$, at a gaseous face velocity of 98.4 meters/min. The pressure drop of the filter layer will generally be at least 1 mm $H_2O$.

FIG. 1 represents an apparatus arrangement 1 for practicing the present invention method of manufacture. A nonwoven filter web layer 10 is supplied from a roll 2 which could also be the web former (e.g., a carding machine or other web forming devices). Additionally, a second filter web layer could be taken off a second roll and joined to web 10. This allows for greater flexibility in the choice of basis weights. The scrim support 11 is fed from a supply roll 4 onto the fibrous filter web layer 10. However, the scrim support 11 could also be fed upstream of the supply roll 2 so that the fibrous filter web layer 10 is laid onto the scrim support 11 or between two scrim support layers 11. A second supply roll 2' can be used so that the scrim support 11 is a center layer between two outer nonwoven filter layers. This is shown in FIG. 1 by a second supply roll with substantially identical numbering (10' and 2'). Likewise, a second fibrous filter web layer could be taken off an adjacent supply roll and joined to web 10' to allow for adjustment in the basis weight. The two fibrous filter web layers 10 and 10' can be of differing basis weights.

The fibrous filter web layer 10, or layers, and scrim support 11 are then fed to a needling station 5 where the filter web layer 10, or layers, is joined to the scrim support 11 by the action of the needles to form the filter media 12. The needles will preferably penetrate a top filter web layer before a scrim support layer to transversely displace fibers securely down into a scrim support, and possibly up into an overlying scrim support, and promote the fiber interlocking with the scrim and with fibers of an underlying filter web layer 10'. The needles can be arranged to penetrate the filter media 12 composite from between about 10 to 300 penetrations per $cm^2$. Higher needling densities tend to compact the filter media 12, increasing pressure loss through the filter media 12. Preferably, the needling is less than 75 penetrations per $cm^2$. The needle-punched joined composite filter media 12 is then collected on take-up roll 6 for subsequent converting into individual filter units by conventional techniques.

The filter webs can be charged in a preferred embodiment by the method described in U.S. Pat. Reissue Nos. 30,782 and 31,285. The electret fibers forming the filter web are formed from an electrostatically charged film (e.g., by a corona discharge electrode) that has been fibrillated to provide electret fibers which have a substantially rectangular cross-section. However, the fibers forming the filter web can be charged by any known charging method such as those described in the Background of the Invention section above.

The electret fibers are preferably formed from a dielectric thermoplastic polymer that is capable of being charged. Suitable materials include polyolefins, such as polypropylene, linear low density polyethylene, poly-1-butene, polytetrafluoroethylene, polytrifluorochloroethylene, poly(4-methyl-1-pentene) or polyvinylchloride; aromatic polyarenes such as polystyrene; polycarbonates; polyesters; and copolymers and blends thereof. Preferred are polyolefins free of branched alkyl radicals and copolymers thereof. Particularly, preferred are polypropylene and polypropylene copolymers. Various functional additives known in the art can be blended with the dielectric polymers or copolymers such as poly(4-methyl-1-pentene) as taught in U.S. Pat. No. 4,874,399, a fatty acid metal salt, as disclosed in U.S. Pat. No. 4,789,504 or particulates, as per U.S. Pat. No. 4,456,648 as well as conventional stabilizers (e.g., heat or U.V. stabilizers), fillers, cross-linking agents or the like as long as they have minimal adverse impact on the electret charging capacity of the polymer in film or fiber forms.

Additional porous layers, such as woven or nonwoven layers, can be attached to the filter such as reinforcing support scrims (e.g., a spunbond layer), prefilter layers, pleatable layers, cover webs and the like. However, these additional layers should be sufficiently open so as not to adversely effect the overall pressure-drop of the filter. These additional layers can be laminated to the filter by conventional means such as by adhesives, point bonding or the like.

The invention filter media can be used in any conventional air filter but is particularly useful in air filters used to filter large volumes of air such as furnace filters, automotive cabin filters and room air cleaner filters. The invention filter media can be incorporated into the filters in any conventional manner in either a flat form or pleated.

EXAMPLES

Physical properties of various support scrims used in the examples are detailed in Table I and porosity characteristics are detailed in Table II. In these Tables, Sample A is CLAF (a cross laminated web of polyethylene fibers) HS-9107, B is CLAF 2S-1501, C is CLAF HS-1701 and D is LUTRASIL 10 gm/m². The LUTRASIL (a nonwoven spun bond fiber scrim material) scrim is available from Firma Karl Freudenberg, Kaiserbautern, Germany. The CLAF scrims are available from Amoco/Nisseke and all were metalized with aluminum. The CLAF scrims have lower initial pressure drops than the LUTRASIL scrim even with significantly higher basis weight CLAF scrims.

For Table I, the basis weights given are the average of five samples. The scrim thickness was determined by combining five samples, measuring the thickness using a "Parallel Plate Thickness Tester" using 0.1 grams/cm pressure and by dividing the measured value by 5. The pressure drop is determined by combining five samples, measuring the combined samples on the AFT Model 8110 (available from TSI, Inc., Minneapolis, Minn.) automated filter testing machine through a sample area of 9.65 cm² at a volumetric flow rate of 100 liters/min to yield a 98.4 meters/min face velocity. Tensile strengths are measured on an Instron model 1122 using a sample size of 2.54 cm by 17.8 cm at a crosshead speed of 288 cm/min.

The scrims (A through C) webs were then analyzed using a Leica Quantamet Q-570 Image Analyzer with a macro lens. Scrim D was analyzed using the Q-370 and a video microscope and incident light (illuminated from an angle). For the scrims samples (A through C) transmitted light was used to highlight the open areas. A sample area of 198.6 mm² was scanned on the CLAF scrim materials while an area of 29.24 mm² was viewed on the LUTRASIL material. Four areas on each sample were scanned or viewed and three samples of each support scrim where tested. The Q-570 camera only measures those open areas that are in focus and therefore are in the same measurement plane. For each sample (A through D), the Q-570 directly measured the number of individual open areas or openings, the length, breath and perimeter of the openings and the area of the openings were measured. From the measured values the average area of an opening, average aspect ratio and the Effective Circular Diameter were calculated. Table II reports for each scrim A through E the average number of openings and the average area (calculated value) of the individual openings as well as the average length, average breath, average perimeter, average aspect ratio (calculated value) and average Effective Circular Diameter (ECD) (calculated value).

The CLAF scrims A through C and E (E is a non-metalized version of C) have a porosity characteristic that provides for up to 300 times more open area than the LUTRASIL scrim (D). Also, the Effective Cylinder Diameter, which is calculated from the area characteristics of each open area, also shows that the CLAF scrims have from 14 to 19 times larger Effective Cylinder Diameter than the LUTRASIL scrim.

Example 1

A scrim supported nonwoven electret-charged fibrous filter media, was made according to the process described in U.S. Pat. No. 5,230,800 (Counterexample 1D). It is made using the 10 gm/m² spunbond scrim LUTRASILT (scrim D) (available from Karl Freudenberg, Kaiserlautern, Germany). The filter web used in the filter media contained approximately about 35 gm/M² of fibrillated film electret fibers made according to U.S. Reissue Pat. Nos. 30,782 and 31,285. Further, three identical filters were made except that they used the CLAF scrims (made by Amoco/Nisseke and metalized with aluminum) (scrims A through C and examples 1A through 1C). These scrims were needled with a nominal 35 gm/m² of the above fibrillated film electret fiber filter webs as described for the filter media prepared using the LUTRASIL scrim above. Filter media was taken from all samples lots for analysis and comparison. The results are set forth in Table III.

The total basis weight of each example filter media was determined by weighing a disc with an area of 100 cm² and converted to gm/m². The average basis weight of the filter web portion of the samples was calculated by subtracting the scrim weight from the total measured basis weight of the filter media. The pressure drop and penetration are measured on the AFT Model 8110 tester, based on a test area with a diameter of 3.8 cm, measured at a test velocity of 100 liters/min (this produced a face velocity equivalent to about 98.4 m/min or 300 ft/min). The challenge air contains an NaCl aerosol. The challenge concentration was calibrated and measured to be 14.66 mg/m³. The "percent penetration" is the ratio of NaCl particle concentration measured downstream and upstream of the filter multiplied by 100. Each test, or test cycle, yields a "pressure drop" and "initial percent penetration" value. The AFT Model 8110 is then cycled continuously (challenged with the same concentration of NaCl particles) until a specific pressure drop (12.5 mm H₂O) is reached. The "Number of Cycles" it takes to reach this specific pressure-drop is considered to be a direct indication of the filter life. This pressure drop is selected as the end of the filter life (i.e., the "Number of Cycles"), since most furnace filter manufacturers consider a filter to need changing when the pressure drop reaches 12.5 mm H₂O at a face velocity of 59 m/min through a pleated filter, or 98.4 m/min through a flat media.

The Quality Factor Q is defined mathematically by the expression:

$$Q = \frac{-\ln(\%P/100)}{\Delta P}$$

where %P is the percent penetration, $\Delta P$ is the pressure drop in mm H₂O, and ln indicates the natural logarithm. This value is always positive and increases with reduced penetration. Conversely, as pressure drop increases Q is reduced. Q is generally an index which is independent of the basis weight. Thus, Q may be used to compare the filtration performance of webs of different basis weights. All the results are the average of three tested samples except for Example 1C which was the average of two samples.

Table III shows that the CLAF scrim backed filters have a significantly lower initial pressure drop with comparable initial percent penetration as compared to the control filter (sample D). However, the CLAF backed filters have up to twice the filter life as calculated based on the number of cycles to an end of life pressure drop of 12.5 mm/H₂O. The CLAF backed filter webs also had higher Q value.

TABLE I

| Scrim | Scrim Basis Weight (g/m²) | Scrim Thickness (mm) | Scrim: Pressure Drop (mm H₂O) | Tensile Strength (kg/m) |
| --- | --- | --- | --- | --- |
| A | 35.0 | 0.21 | .931 | 297.8 |
| B | 23.1 | 0.15 | .507 | 196.2 |
| C | 15.9 | 0.12 | .501 | 123.9 |
| Counter-example D | 10.0 | 0.08 | 1.008 | 22.4 |

TABLE II

| Scrim | Open Area (mm²) | Length (mm) | Breadth (mm) | Perimeter (mm) | Aspect Ratio | ECD (mm) | Openings Number |
|---|---|---|---|---|---|---|---|
| A | 1.4 | 1.8 | 0.98 | 4.8 | 2.2 | 1.2 | 629 |
| B | 2.0 | 2.1 | 1.2 | 5.8 | 2.2 | 1.5 | 511 |
| C | 2.0 | 2.1 | 1.1 | 5.8 | 2.2 | 1.5 | 517 |
| D | 0.008 | 0.26 | 0.034 | 0.22 | 2.3 | 0.085 | 785 |
| E | 2.4 | 2.3 | 1.3 | 6.3 | 2.2 | 4.6 | 405 |

TABLE III

| Examples | Cycles to 12.5 mm H₂O | Basis Weight Filter Web (g/m²) | Quality Factor | Initial Pressure Drop (mm H₂O) | Initial Penetration (%) |
|---|---|---|---|---|---|
| 1A | 23.3 | 30.92 | 0.076 | 4.2 | 73.1 |
| 1B | 27.0 | 31.96 | 0.083 | 3.6 | 74.7 |
| 1C | 30 | 31.3 | 0.081 | 3.5 | 76.6 |
| Counterexample 1D | 15.7 | 31.90 | 0.060 | 4.8 | 75.2 |

Example II

Filter media was made using a similar process, and tested, as described in Example 1 using scrims A through D and 40 gm/m² of the same type of fibrillated film electret charged fiber filter web.

The filter media was tested as in Example I above with the results presented in Table IV where each reported result is the average of five test samples.

Table IV again shows that filter life can be substantially increased while pressure drop is decreased with a higher Q value when using support scrim with large individual open areas.

TABLE IV

| Examples | Cycles to 12.5 mm H₂O | Basis Weight (g/m²) | Quality Factor | Initial Pressure Drop (mm H₂O) | Initial Penetration (%) |
|---|---|---|---|---|---|
| 2A | 14.4 | 40.17 | 0.063 | 5.9 | 68.8 |
| 2B | 17.8 | 40.10 | 0.076 | 4.9 | 69.0 |
| 2C | 20.5 | 40.16 | 0.078 | 4.6 | 69.7 |
| Counterexample 2D | 11.8 | 39.83 | 0.072 | 6.4 | 63.2 |

Example III

A tribo-charged electret filter web was made following the procedures described in U.S. Pat. No. 4,798,850. This web was made using the following fibers:

70% by weight 4 denier polypropylene; and

30% by weight 3 denier polyester, T-183 from Hoechst Celanese Corporation.

This filter web was randomized, carded and needle-tacked to a scrim, according to the procedures detailed in U.S. Pat. No. 5,230,800, per the following descriptions:

Scrim D with a 27.73 gm/m² tribo-charged electret fiber web (Counterexample 3D);

CLAF 2S-1601, 18 gm/m² scrim, with a 28.75 gm/m² tribo-charged electret fiber web (Example 3A); and CLAF 2S-1601, metalized 18 gm/m² scrim with 5 gm/m² aluminum, with a 29.64 gm/m² tribo-charged electret fiber web (Example 3B).

All the formed filter media was tested for filtration properties per the test detailed in Example I. Table V details the results from this example. The example filters (3A and 3B) had lower initial pressure drops, longer life cycles to an end of life pressure drop of 12.5 mm H₂O and higher overall Q values than that of the counterexample filter (3D) which used the lower basis weight but lower average opening area LUTRASIL scrim. The pressure drop improvement and life improvement are higher than those experienced in the Example I filter webs which is likely due to the support scrim basis weight and pressure drop being a higher percentage of the overall filter basis weight and pressure drop.

The various modifications and alterations of this invention will be apparent to those skilled in the art without departing from the scope and spirit of this invention, and this invention should not be restricted.

TABLE V

| Example | Cycles to 12.5 mm H₂O | Fiber Basis Weight (g/m²) | Scrim Thickness (mm) | Quality Factor | Initial Pressure Drop (mm H₂O) | Initial Penetration (%) |
|---|---|---|---|---|---|---|
| 3A | 58.7 | 28.75 | 0.12 | 0.028 | 2.6 | 92.9 |
| 3B | 50.7 | 29.64 | 0.12 | 0.028 | 3.1 | 91.5 |
| Counterexample 3D | 23.3 | 27.73 | 0.06 | 0.026 | 4.0 | 90.2 |

I claim:

1. An electret fiber nonwoven filter media comprising at least one nonwoven filter web comprising entangled fibers, at least some of which are electrostatically charged electret fibers, wherein the web is joined to at least one reinforcement scrim by needle-punching, said reinforcement scrim having discrete open areas where the average open area has a cross-sectional area of at least 0.25 mm² and the reinforcement scrim has an overall pressure drop of less than 2.0 mm H₂O at 98.4 meters/min, wherein said open areas extend from one face to the opposite face of the scrim in a non-tortuous path.

2. The electret fiber nonwoven filter media of claim 1 wherein the reinforcement scrim discrete open areas average cross-sectional area is at least 0.5 mm².

3. The electret fiber nonwoven filter media of claim 1 wherein the reinforcement scrim discrete open areas average cross-sectional area is at least 1.0 mm².

4. The electret fiber nonwoven filter media of claim 3 wherein the reinforcement scrim has a tensile strength of at least 50 kg/m.

5. The electret fiber nonwoven filter media of claim 1 wherein the reinforcement scrim discrete open areas have an average pathlength such that the ratio of the average pathlength to average scrim thickness is from 3 to 1.

6. The electret fiber nonwoven filter media of claim 1 wherein the reinforcement scrim discrete open areas have an average aspect ratio of from 0.5 to 5 and the reinforcement scrim discrete open areas have an average pathlength such that the ratio of the average pathlength to average scrim thickness is from 2 to 1.

7. The electret fiber nonwoven filter media of claim 1 wherein the reinforcement scrim discrete open areas have an average ECD of at least 300 μm.

8. The electret fiber nonwoven filter media of claim 1 wherein the reinforcement scrim has a tensile strength of at least 50 kg/m.

9. The electret fiber nonwoven filter media of claim 1 wherein the reinforcement scrim has a tensile strength of at least 100 kg/m.

10. The electret fiber nonwoven filter media of claim 1 wherein the reinforcement scrim pressure drop is less than 1.5 mm $H_2O$.

11. The electret fiber nonwoven filter media of claim 1 wherein the reinforcement scrim pressure drop is less than 1.0 mm $H_2O$.

12. The electret fiber nonwoven filter media of claim 1 wherein the reinforcement scrim pressure drop is less than 50 percent of the pressure drop of the filter web.

13. The electret fiber nonwoven filter media of claim 1 wherein the reinforcement scrim is formed of thermoplastic polymer fibers.

14. The electret nonwoven filter media of claim 1 wherein the electret fibers comprise a fibrillated electrostatically charged film of a film forming polymer.

15. The electret nonwoven filter media of claim 1 wherein the electret fibers are polypropylene polymers or copolymers.

16. The electret nonwoven filter media of claim 1 wherein the reinforcement scrim is a center layer between two outer layers of nonwoven filter web.

17. The electret nonwoven filter media of claim 1 wherein the at least one nonwoven filter web is a carded web.

18. The electret nonwoven filter media of claim 1 wherein the at least one nonwoven filter web is a melt blown web.

19. The electret nonwoven filter media of claim 1 wherein the at least one nonwoven filter web has a total basis weight of less than 120 gm/m$^2$.

20. The electret nonwoven filter media of claim 1 further comprising an outer reinforcing layer laminated to an outer face of the filter.

* * * * *